(12) United States Patent
Ljungblad et al.

(10) Patent No.: US 9,718,129 B2
(45) Date of Patent: Aug. 1, 2017

(54) ADDITIVE MANUFACTURING METHOD AND APPARATUS

(71) Applicant: Arcam AB, Moelndal (SE)

(72) Inventors: Ulric Ljungblad, Moelndal (SE); Martin Wildheim, Moelndal (SE)

(73) Assignee: Arcam AB, Moelndal (SE)

(*) Notice: Subject to any disclaimer, the term of this patent is extended or adjusted under 35 U.S.C. 154(b) by 0 days.

(21) Appl. No.: 14/443,015

(22) PCT Filed: Nov. 18, 2013

(86) PCT No.: PCT/EP2013/074092
§ 371 (c)(1),
(2) Date: May 14, 2015

(87) PCT Pub. No.: WO2014/095200
PCT Pub. Date: Jun. 26, 2014

(65) Prior Publication Data
US 2015/0283610 A1 Oct. 8, 2015

Related U.S. Application Data

(60) Provisional application No. 61/738,203, filed on Dec. 17, 2012.

(51) Int. Cl.
*B22F 3/105* (2006.01)
*B22F 7/00* (2006.01)
(Continued)

(52) U.S. Cl.
CPC .............. *B22F 3/1055* (2013.01); *B22F 5/00* (2013.01); *B22F 7/02* (2013.01); *B29C 67/0077* (2013.01);
(Continued)

(58) Field of Classification Search
CPC .......... B22F 3/1055; B22F 2003/1056; B29C 67/088; B29C 67/0077; B33Y 10/00
(Continued)

(56) References Cited

U.S. PATENT DOCUMENTS 2,264,968 A 12/1941 De Forest
2,323,715 A 7/1943 Kuehni
(Continued)

FOREIGN PATENT DOCUMENTS

CA 2860188 A1 6/2006
CN 101607311 A 12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — Jonathan Johnson
*Assistant Examiner* — Jeremy Jones
(74) *Attorney, Agent, or Firm* — Alston & Bird LLP

(57) ABSTRACT

A method for forming a three-dimensional article, said method comprising the steps of: providing a predetermined amount of powder for forming a first powder layer on a start plate, distributing said predetermined amount of powder with a powder distributor for forming said first powder layer, directing an energy beam over said start plate causing said first powder layer to fuse in selected locations according to a model to form a first cross section of said three-dimensional article. At least one image of the powder to be distributed is captured with a camera at least one time during said distribution of said powder on said start plate for forming said first powder layer and at least one value of at
(Continued)

least one parameter in said image detected with said camera is compared with a reference parameter value.

11 Claims, 6 Drawing Sheets

(51) Int. Cl.
- B22F 7/02 (2006.01)
- B29C 67/00 (2017.01)
- B22F 5/00 (2006.01)
- B33Y 10/00 (2015.01)

(52) U.S. Cl.
CPC ...... *B29C 67/0085* (2013.01); *B29C 67/0088* (2013.01); *B22F 2003/1056* (2013.01); *B33Y 10/00* (2014.12); *Y02P 10/295* (2015.11)

(58) Field of Classification Search
USPC .......................................................... 419/55
See application file for complete search history.

(56) References Cited

U.S. PATENT DOCUMENTS

| | | | |
|---|---|---|---|
| 3,882,477 A | 5/1975 | Mueller | |
| 4,348,576 A | 9/1982 | Anderl et al. | |
| 4,352,565 A | 10/1982 | Rowe et al. | |
| 4,401,719 A | 8/1983 | Kobayashi et al. | |
| 4,818,562 A | 4/1989 | Arcella et al. | |
| 4,863,538 A | 9/1989 | Deckard | |
| 4,888,490 A | 12/1989 | Bass et al. | |
| 4,927,992 A | 5/1990 | Whitlow et al. | |
| 4,988,844 A | 1/1991 | Dietrich et al. | |
| 5,118,192 A | 6/1992 | Chen et al. | |
| 5,135,695 A | 8/1992 | Marcus | |
| 5,167,989 A | 12/1992 | Dudek et al. | |
| 5,182,170 A | 1/1993 | Marcus et al. | |
| 5,204,055 A | 4/1993 | Sachs et al. | |
| 5,247,560 A | 9/1993 | Hosokawa et al. | |
| 5,393,482 A | 2/1995 | Benda et al. | |
| 5,483,036 A | 1/1996 | Giedt et al. | |
| 5,511,103 A | 4/1996 | Hasegawa | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,554,600 B1 | 4/2003 | Hofmann et al. | |
| 6,583,379 B1 | 6/2003 | Meiners et al. | |
| 6,676,892 B2 | 1/2004 | Das et al. | |
| 6,724,001 B1 | 4/2004 | Pinckney et al. | |
| 6,746,506 B2 | 6/2004 | Liu et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,452,500 B2 | 11/2008 | Uckelmann | |
| 7,537,722 B2 | 5/2009 | Andersson et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,754,135 B2 | 7/2010 | Abe et al. | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 9,505,172 B2 | 11/2016 | Ljungblad | |
| 9,550,207 B2 | 1/2017 | Ackelid | |
| 2002/0104973 A1 | 8/2002 | Kerekes | |
| 2002/0152002 A1 | 10/2002 | Lindemann et al. | |
| 2002/0195747 A1 | 12/2002 | Hull et al. | |
| 2003/0133822 A1 | 7/2003 | Harryson | |
| 2003/0205851 A1 | 11/2003 | Laschutza et al. | |
| 2004/0012124 A1* | 1/2004 | Li | B22F 3/004 264/460 |
| 2004/0026807 A1* | 2/2004 | Andersson | B29C 67/0077 264/40.1 |
| 2004/0084814 A1 | 5/2004 | Boyd et al. | |
| 2004/0104499 A1 | 6/2004 | Keller | |
| 2004/0148048 A1 | 7/2004 | Farnworth | |
| 2004/0173496 A1* | 9/2004 | Srinivasan | A61M 15/0028 206/528 |
| 2004/0173946 A1 | 9/2004 | Pfeifer et al. | |
| 2004/0204765 A1* | 10/2004 | Fenning | A61B 17/1764 623/20.29 |
| 2004/0217095 A1 | 11/2004 | Herzog | |
| 2005/0173380 A1 | 8/2005 | Carbone | |
| 2005/0186538 A1 | 8/2005 | Uckelmann | |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0175875 A1 | 8/2007 | Uckelmann et al. | |
| 2007/0179655 A1* | 8/2007 | Farnworth | B29C 67/0066 700/114 |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2009/0206056 A1* | 8/2009 | Xu | H01J 37/3244 216/59 |
| 2010/0260410 A1 | 10/2010 | Taminger et al. | |
| 2010/0310404 A1 | 12/2010 | Ackelid | |
| 2010/0316856 A1 | 12/2010 | Currie et al. | |
| 2011/0061591 A1* | 3/2011 | Stecker | B22F 3/1055 118/663 |
| 2011/0133367 A1 | 6/2011 | Weidinger et al. | |
| 2011/0241575 A1 | 10/2011 | Caiafa et al. | |
| 2011/0293770 A1 | 12/2011 | Ackelid et al. | |
| 2011/0293771 A1 | 12/2011 | Oberhofer et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0164322 A1 | 6/2012 | Teulet | |
| 2012/0183701 A1 | 7/2012 | Pilz et al. | |
| 2012/0193530 A1 | 8/2012 | Parker et al. | |
| 2012/0223059 A1 | 9/2012 | Ackelid | |
| 2012/0225210 A1 | 9/2012 | Fruth | |
| 2012/0266815 A1 | 10/2012 | Brunermer | |
| 2013/0055568 A1 | 3/2013 | Dusel et al. | |
| 2013/0186514 A1 | 7/2013 | Zhuang et al. | |
| 2013/0216959 A1 | 8/2013 | Tanaka et al. | |
| 2013/0264750 A1 | 10/2013 | Hofacker et al. | |
| 2013/0300286 A1 | 11/2013 | Ljungblad et al. | |
| 2013/0343947 A1 | 12/2013 | Satzger et al. | |
| 2014/0175708 A1 | 6/2014 | Echigo et al. | |
| 2014/0271964 A1 | 9/2014 | Roberts, IV et al. | |
| 2014/0301884 A1 | 10/2014 | Hellestam et al. | |
| 2014/0308153 A1 | 10/2014 | Ljungblad | |
| 2014/0314609 A1 | 10/2014 | Ljungblad et al. | |
| 2014/0314964 A1 | 10/2014 | Ackelid | |
| 2014/0348691 A1 | 11/2014 | Ljungblad et al. | |

(56) References Cited

U.S. PATENT DOCUMENTS

| | | |
|---|---|---|
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102008012064 A1 | 9/2009 | |
| DE | 102010041284 A1 | 3/2012 | |
| DE | 102011105045 B3 | 6/2012 | |
| DE | 102013210242 A1 | 12/2014 | |
| EP | 0289116 A1 | 11/1988 | |
| EP | 0322257 A2 | 6/1989 | |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 1721725 A1 | 11/2006 | |
| EP | 1752240 A1 | 2/2007 | |
| EP | 1952932 A2 | 8/2008 | |
| EP | 2011631 A1 | 1/2009 | |
| EP | 2119530 A1 | 11/2009 | |
| EP | 2281677 A1 | 2/2011 | |
| FR | 2980380 A1 | 3/2013 | |
| JP | 2003241394 A | 8/2003 | |
| JP | 2003245981 | 9/2003 | |
| JP | 2009006509 A | 1/2009 | |
| SE | 524467 C2 | 8/2004 | |
| WO | WO 93/08928 | 5/1993 | |
| WO | WO 96/12607 A1 | 5/1996 | |
| WO | WO 97/37523 A2 | 10/1997 | |
| WO | WO 01/81031 A1 | 11/2001 | |
| WO | WO 01/85386 A2 | 11/2001 | |
| WO | WO 02/08653 A1 | 1/2002 | |
| WO | WO 2004/007124 A1 | 1/2004 | |
| WO | WO 2004/043680 A2 | 5/2004 | |
| WO | WO 2004/054743 A1 | 7/2004 | |
| WO | WO 2004/056511 A1 | 7/2004 | |
| WO | WO 2004/106041 A2 | 12/2004 | |
| WO | WO 2004/108398 A1 | 12/2004 | |
| WO | WO 2006/091097 A2 | 8/2006 | |
| WO | WO 2006/121374 A1 | 11/2006 | |
| WO | WO 2007/112808 A1 | 10/2007 | |
| WO | WO 2007/147221 A1 | 12/2007 | |
| WO | WO 2008/013483 A1 | 1/2008 | |
| WO | WO 2008/057844 A1 | 5/2008 | |
| WO | WO 2008/074287 A1 | 6/2008 | |
| WO | WO 2008/125497 A1 | 10/2008 | |
| WO | WO 2008/147306 A1 | 12/2008 | |
| WO | WO 2009/000360 A1 | 12/2008 | |
| WO | WO 2009/072935 A1 | 6/2009 | |
| WO | WO 2009/084991 A1 | 7/2009 | |
| WO | WO 2010/095987 A1 | 8/2010 | |
| WO | WO 2010/125371 A1 | 11/2010 | |
| WO | WO 2011/008143 A1 | 1/2011 | |
| WO | WO 2011008143 A1 * | 1/2011 | ......... B29C 67/0077 |
| WO | WO 2011/011818 A1 | 2/2011 | |
| WO | WO 2011/030017 A1 | 3/2011 | |
| WO | WO 2011/060312 A2 | 5/2011 | |
| WO | WO 2012/102655 A1 | 8/2012 | |
| WO | WO 2013/098050 A1 | 7/2013 | |
| WO | WO 2013/098135 A1 | 7/2013 | |
| WO | WO 2013/159811 A1 | 10/2013 | |
| WO | WO 2013/167194 A1 | 11/2013 | |
| WO | WO 2013/178825 A2 | 12/2013 | |
| WO | WO 2014/071968 A1 | 5/2014 | |
| WO | WO 2014/092651 A1 | 6/2014 | |
| WO | WO 2014/095200 A1 | 6/2014 | |
| WO | WO 2014/095208 A1 | 6/2014 | |
| WO | WO 2014/195068 A1 | 12/2014 | |
| WO | WO 2015/032590 A2 | 3/2015 | |
| WO | WO 2015/091813 A1 | 6/2015 | |
| WO | WO 2015/142492 A1 | 9/2015 | |

OTHER PUBLICATIONS

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, T., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

International Searching Authority, International Search Report for International Application No. PCT/EP2013/074092, Jan. 31, 2014, 4 pages, European Patent Office, The Netherlands.

International Preliminary Examining Authority, International Preliminary Report on Patentability for International Application No. PCT/EP2013/074092, Jan. 5, 2015, 6 pages, European Patent Office, The Netherlands.

* cited by examiner

ADDITIVE MANUFACTURING METHOD AND APPARATUS

CROSS REFERENCE TO RELATED APPLICATIONS

This application is a National Stage Application, filed under 35 U.S.C. §371, of International Application No. PCT/EP2013/074092, filed Nov. 18, 2013, which claims priority to U.S. Provisional Application No. 61/738,203, filed Dec. 17, 2012, the contents of both which as are hereby incorporated by reference in their entirety.

BACKGROUND

Related Field

The present invention relates to a method for forming a three-dimensional article according to the preamble of claim 1.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a start plate on which said three-dimensional article is to be formed, a powder dispenser, arranged to lay down a thin layer of powder on the start plate for the formation of a powder bed, a ray gun for delivering energy to the powder whereby fusion of the powder takes place, elements for control of the ray given off by the ray gun over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In US 2009/0152771 it is provided a camera for capturing an Infrared-radiation image, more particularly this camera is used for detecting irregularities in a newly applied powder layer. The irregularities may, according to US 2009/0152771, be caused by irregular applying of the powder on the working table or contamination in the powder dispenser or impurities in the powder as such. There is a need in the art for a method and apparatus in which the cause for irregular powder distribution may be detected for future repair in the additive manufacturing system.

BRIEF SUMMARY

An object of the invention is to provide a method and apparatus which solve the above mentioned need in the art.

The abovementioned object is achieved by the features in the method according to claim 1.

In a first aspect of the invention it is provided a method for forming a three-dimensional article through successive fusion of parts of a powder bed, which parts corresponds to successive cross sections of the three-dimensional article, said method comprising the steps of: (a) providing a predetermined amount of powder for forming a first powder layer on a surface, (b) distributing said predetermined amount of powder for forming said first powder layer on said surface, (c) directing an energy beam over said first powder layer causing said first powder layer to fuse in selected locations according to a model to form a first cross section of said three-dimensional article, (d) capturing at least one image of the powder to be distributed with a camera at least one time during said distribution of said powder on said surface for forming said first powder layer, and (e) comparing at least one value of at least one parameter in said image detected by said camera with a corresponding reference parameter value.

An advantage of this embodiment is that an indication of an error in the build may be given already in the powder distribution phase. A message may be sent to the operator that the powder distribution may be incorrect and/or said position of the powder distributor and the number of the layer in which this happened may be stored in a control unit.

In one example embodiment of the present invention said predetermined amount of powder for forming a second powder layer on top of said first powder layer which is fused in selected locations may change if at least one parameter value in said image is deviating at least one Δ-value from a corresponding reference parameter value.

An advantage of this embodiment is that there may be a feed back to a powder provision mechanism in which the amount of powder is changed during building the article. Increasing the powder amount if there is an indication of too less powder during the powder distribution process and decreasing the powder amount if there is an indication that there is too much powder which is distributed over the start plate for forming a powder layer.

In another example embodiment according to the present invention a second predetermined amount of powder is provided for forming said first powder layer a second time and distributing said second predetermined amount of powder for forming said first powder layer said second time if at least one parameter value in said image is at least one Δ-value smaller than a corresponding reference parameter value when forming said first powder layer said first time.

An advantage of this embodiment is that any failure in the powder application mechanism may be corrected before starting to fuse the powder layer and thereby creating defects in the three-dimensional article because of a non-homogenous powder layer.

In another example embodiment of the present invention said parameter in said image may be one of the group of: shape of powder in front of a powder distributor; distance of powder front to a reference position; width of powder front and/or position of powder front.

An advantage of this embodiment is that a number of different parameters may be used in order to check the powder distribution process and the resulting powder layer that comes from this distribution process. Deviations from a predetermined reference value of anyone of said parameters may be an indication of an erroneous powder layer. In such a case one may start a second powder application process for such a layer, i.e., the erroneous powder layer may immediately started to be repaired before the powder layer is fused in selected locations.

In another aspect of the invention it is provided an apparatus for forming a three-dimensional article through successive fusion of parts of a powder bed, which parts corresponds to successive cross sections of the three-dimensional article, said apparatus comprising: (a) means for providing a predetermined amount of powder for forming a first powder layer on a surface, (b) a powder distributor for distributing said predetermined amount of powder for forming said first powder layer, (c) means for directing an energy beam over said first powder layer causing said first powder layer to fuse in selected locations according to a model to form a first cross section of said three-dimensional article, (d) a camera for capturing at least one image of the powder to be distributed at least one time during said distribution of said powder on said surface for forming said first powder layer, and (e) means for comparing at least one value of at least one parameter in said image detected by said camera with a corresponding reference parameter value.

Further example embodiment of the apparatus is evident from the description, figures and dependent claims. The advantage of the different embodiments of the apparatus is similar to the advantage of the corresponding method and need therefore not to be repeated in this context.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

Figure 2:
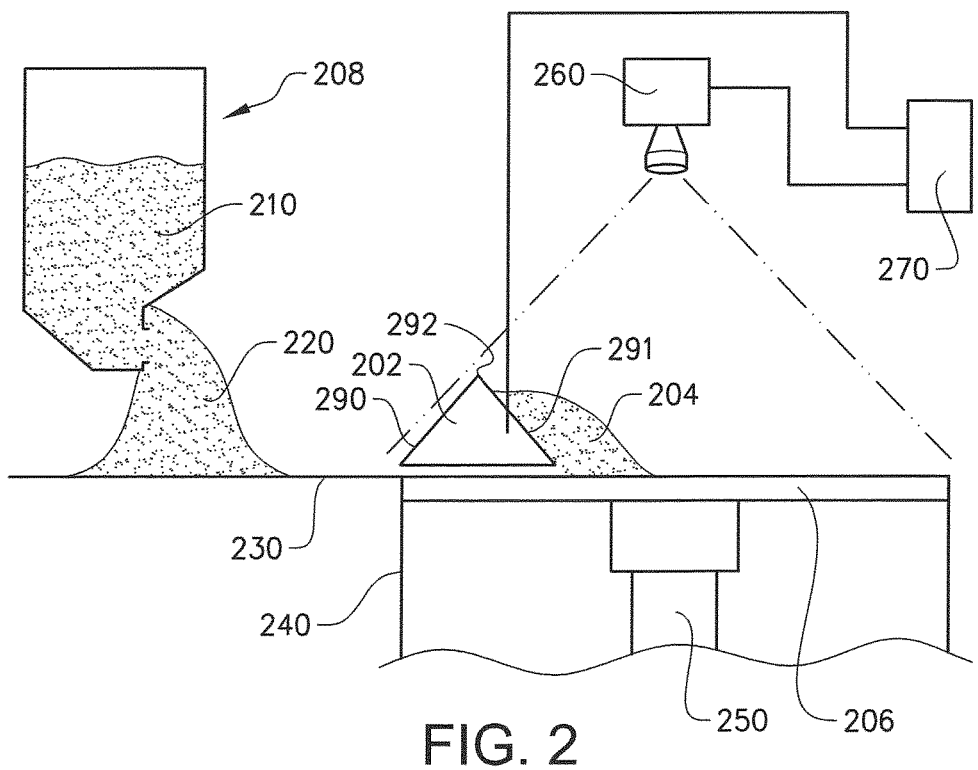
FIG. 2 depicts a side view of a part of an example embodiment of an additive manufacturing apparatus according to the present invention.
Figure 3:
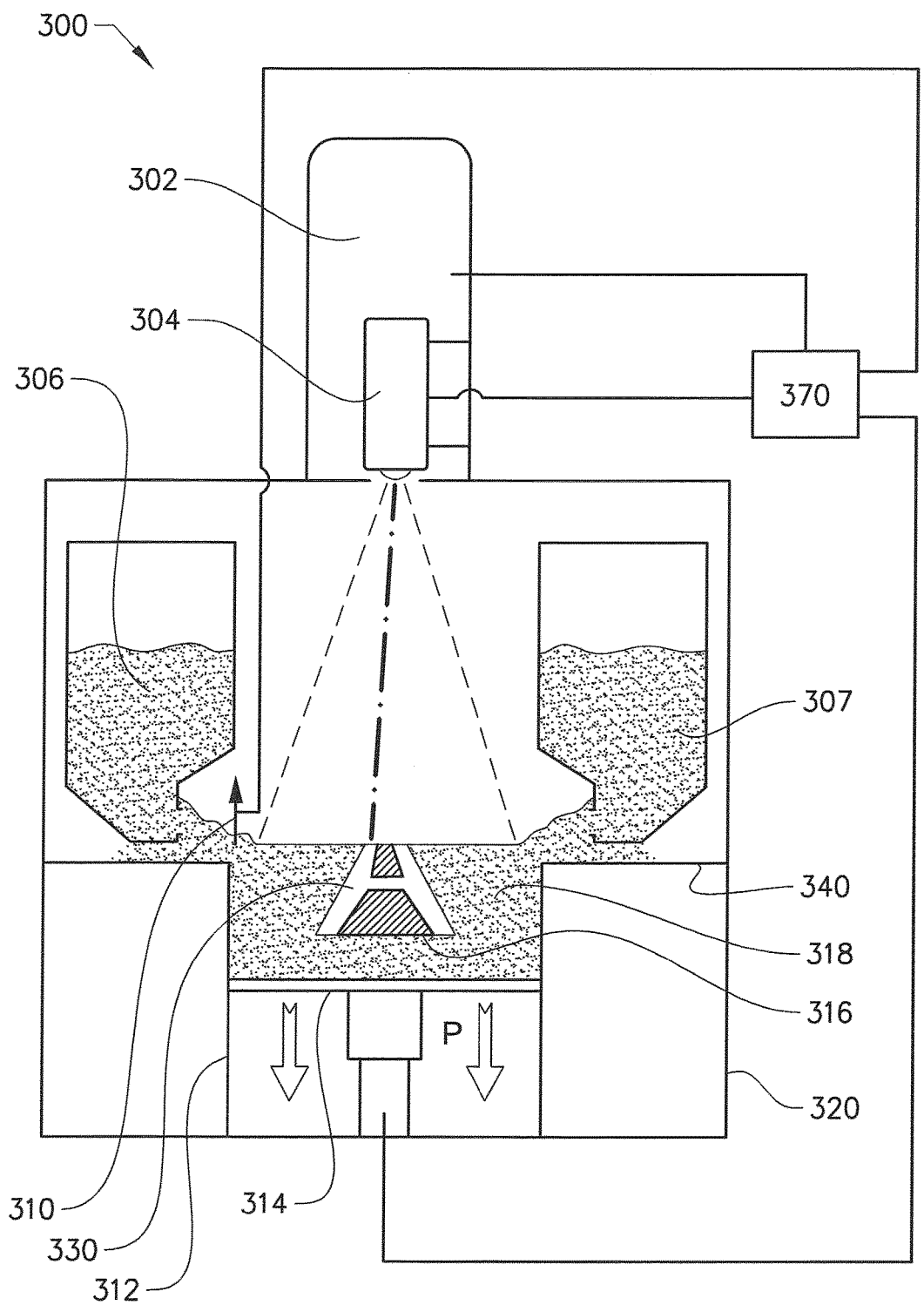
FIG. 3 depicts schematic side view of an example embodiment of an additive manufacturing apparatus according to the present invention.

FIG. 2 depicts side view of a part of an additive manufacturing apparatus according to the present invention, and FIG. 3 depicts a schematic side view of a freeform fabrication or additive manufacturing apparatus 300 according to of the present invention. Said apparatus 300 comprising an electron gun 302; a camera 304, 260; powder hoppers 208, 306, 307; a start plate 316; a build tank 312, 240; a powder distributor 310, 202; a powder table 230, 340; a build platform 314, 206; a vacuum chamber 320 and a control unit 270, 370.

The vacuum chamber 320 is capable of maintaining a vacuum environment by means of a vacuum system, which system may comprise a turbo molecular pump, a scroll pump, an ion pump and one or more valves which are well known to a skilled person in the art and therefore need no further explanation in this context. The vacuum system may be controlled by a control unit 270, 370.

The electron gun 302 is generating an electron beam which is used for melting or fusing together powder material 318 provided on the start plate 316. At least a portion of the electron gun 302 may be provided in the vacuum chamber 320. A control unit 270, 370 may be used for controlling and managing the electron beam emitted from the electron beam gun 302. At least one focusing coil (not shown), at least one deflection coil and an electron beam power supply may be electrically connected to said control unit 270, 370. In an example embodiment of the invention said electron gun generates a focusable electron beam with an accelerating voltage of about 60 kV and with a beam power in the range of 0-3 kW. The pressure in the vacuum chamber may be in the range of $10^{-3}$-$10^{-6}$ mBar when building the three-dimensional article by fusing the powder layer by layer with the energy beam.

Instead of melting the powder material with an electron beam a laser beam may be used.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc.

The powder distributor 310 is arranged to lay down a thin layer of the powder material on the start plate 316. During a work cycle the build platform 314 will be lowered successively in relation to the ray gun after each added layer of powder material. In order to make this movement possible, the build platform 314, 206 is in one embodiment of the invention arranged movably in vertical direction, i.e., in the direction indicated by arrow P. This means that the build platform 314, 206 starts in an initial position, in which a first powder material layer of necessary thickness has been laid down on said start plate 316. A first layer of powder material may be thicker than the other applied layers. The reason for starting with a first layer which is thicker than the other layers is that one does not want a melt-through of the first layer onto the start plate. The build platform is thereafter lowered in connection with laying down a new powder material layer for the formation of a new cross section of a three-dimensional article. Means for lowering the build platform 314, 206 may for instance be through a servo engine equipped with a gear, adjusting screws etc.

In an example embodiment said start plate 316 may be said build platform 314, 206. In such case said build platform 314, 206 is removable from the build tank 312.

In an example embodiment of a method, a three-dimensional article may be formed through successive fusion of parts of a powder bed, which parts corresponds to successive cross sections of the three-dimensional article, comprising a step of providing a model of said three dimensional article. Said model may be generated via a CAD (Computer Aided Design) tool.

Figure 4A:
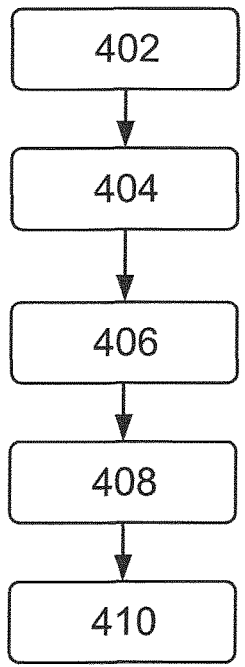
FIG. 4a depicts a flow chart of a first example embodiment of the method according to the present invention.

A predetermined amount of powder may be provided at a powder table 230, 340 denoted by step 402 in FIG. 4a. Said predetermined amount of powder is in the illustrated example embodiment provided on said powder table 230, 340 by means of a powder hopper 306, 307, 208 provided with an opening at the bottom end which is creating a screen of powder 220 on said powder table 230.

Figure 5:
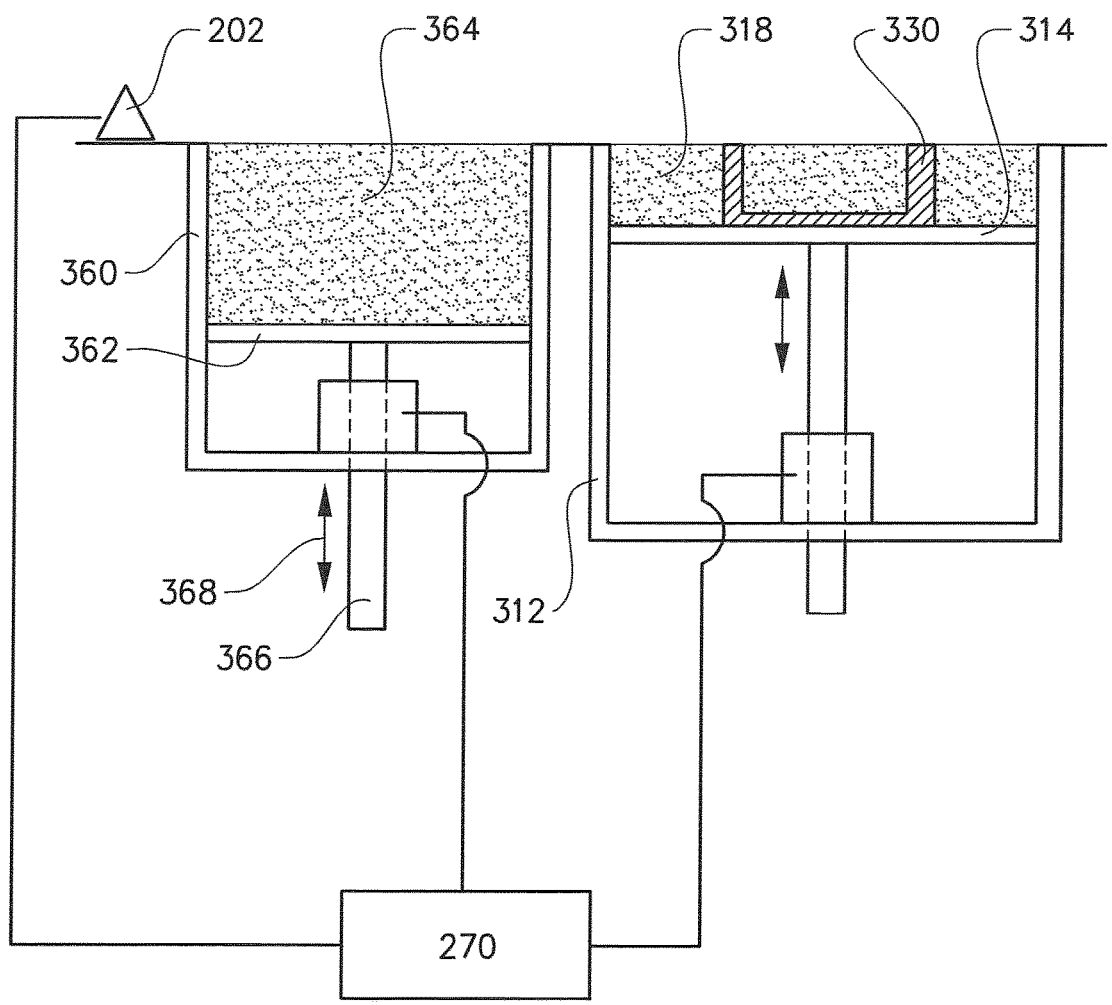
FIG. 5 depicts a side view of an alternative powder distribution process.

Instead of providing the powder from said powder hopper on said powder table an arrangement according to FIG. 5 may be used. In FIG. 5 a powder container 360 with a movable floor us used for providing a predetermined amount of powder. The movable floor may be moved in a vertical direction indicated by the arrow 368 in FIG. 5. The build tank for building the 3-dimensional article is arranged beside said powder container. I predetermined amount of powder is provided by increasing the height of the floor in said powder container thereby lifting a predetermined amount of powder from said powder container. A powder distributor 202 may thereafter rake said powder which is lifted up from the powder container and distribute said powder on said build platform 314. The amount of powder to be distributed from said powder container may easily be changed by changing the distance said floor is lifted up from said powder container. A control computer 270 may be controlling the lifting of said floor 362 in said powder container 360, which may be with a motor connected to a shaft 366 which may in turn connected to said floor 362. Said control computer may also control the lowering of said build platform 314 in said build tank 312.

A first powder layer may be provided on the start plate 316. In an example embodiment the first powder layer is provided on a surface which may be a start plate or a powder bed.

In a first example embodiment powder may be collected by a powder distributor or a rake 202, 310 by moving the rake 202, 310 with its first surface 290 a predetermined distance in a first direction into the scree of powder 220 allowing a predetermined amount of powder to fall over a top of said rake 202. The rake 202 is then moved in a second direction, opposite to said first direction, and thereby removing said predetermined amount of powder which has fallen over the top of said rake 202, 310 from said scree of powder with a second surface 291 of said rake 202, 310.

In an alternative method said powder to be distributed over said start plate 316 may be collected from a powder container 360 with a movable bottom as described in connection with FIG. 5 above.

The powder removed from the scree of powder 220 or scraped off from the powder container 360 or provided by any other suitable mechanism in front of the rake 202 may be moved over the build tank 312, 240 by means of said rake 202, 310, thereby distributing the powder over the start plate 316 or said build platform 314, 206 denoted by step 404 in FIG. 4a.

The distance between a lower part of the rake and the upper part of the start plate or previous powder layer determines the thickness of powder distributed over the start plate. The powder layer thickness can easily be adjusted by adjusting the height of the build platform 314, 206.

An energy beam may be directed over said start plate 316 causing said first powder layer to fuse in selected locations to form a first cross section of said three-dimensional article according to said model generated via said CAD tool denoted with step 406 in FIG. 4a.

The energy beam may be an electron beam or a laser beam. The beam is directed over said start plate 316 from instructions given by the control unit 270, 370. In the control unit 270, 370 instructions for how to control the beam gun for each layer of the three-dimensional article may be stored.

After a first layer is finished, i.e., the fusion of powder material for making a first layer of the three-dimensional article, a second powder layer is provided on said start plate 316. The second powder layer is preferably distributed according to the same manner as the previous layer. However, there might be alternative methods in the same additive manufacturing machine for distributing powder onto the work table 316. For instance, a first layer may be provided by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer on the work table 316, the energy beam is directed over said work table 316 causing said second powder layer to fuse in selected locations to form a second cross section of said three-dimensional article. Fused portions in the second layer may be bonded to fused portions of said first layer. The fused portions in the first and second layer may be melted together by melting not only the powder in the uppermost layer but also remelting at least a fraction of a thickness of a layer directly below said uppermost layer.

An image may be captured of the powder to be distributed with a camera at least one time during the distribution of powder over the work table 316 for forming a powder layer denoted by 408 in FIG. 4a. The image may be taken by the camera 304 provided inside or outside the vacuum chamber 320. The camera 304 may be any type of camera for example an IR-camera (Infrared-camera), NIR-camera (Near Infrared-camera), a VISNIR-camera (Visual Near Infrared-camera), a CCD camera (Charged Coupled Device-camera), a CMOS-camera (Complementary Metal Oxide Semiconductor-camera), a digital camera.

Figure 1:
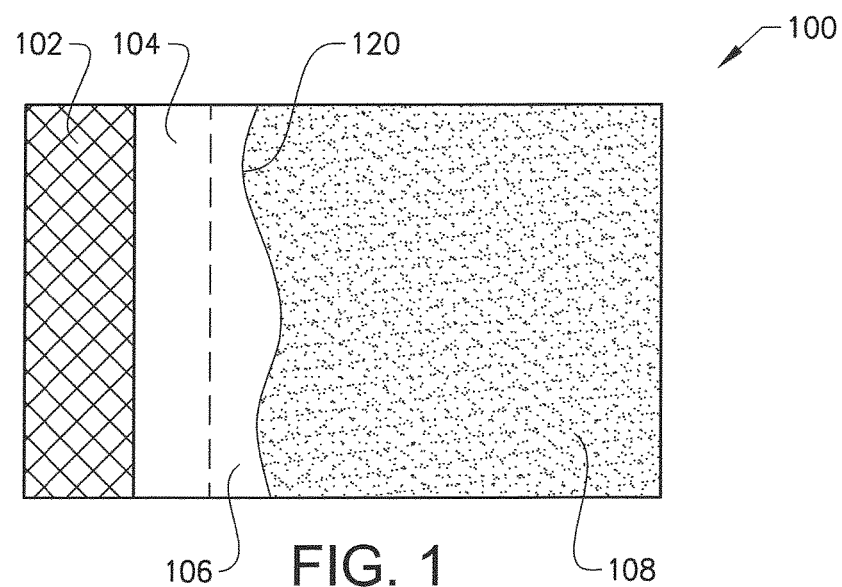
FIG. 1 depicts a top view camera image of a powder distribution process.

FIG. 1 illustrates a possible example of such an image 100 of the powder to be distributed. The image is taken from above, i.e., a top view of the powder layer and the powder distributor 202. In FIG. 1 area 102 represents an area on which a new powder already has been provided. Area 104 represents the powder distributor 202 and powder which is to be distributed and is provided in front of the powder distributor 202. Area 108 represents the previous layer or a blank start plate 316. Powder to be distributed is concentrated in an area 106 to the right of the top portion 292 of the powder distributor. The skilled person will understand that different shapes of powder distributor may be used than the one in the example embodiments.

Figure 6:
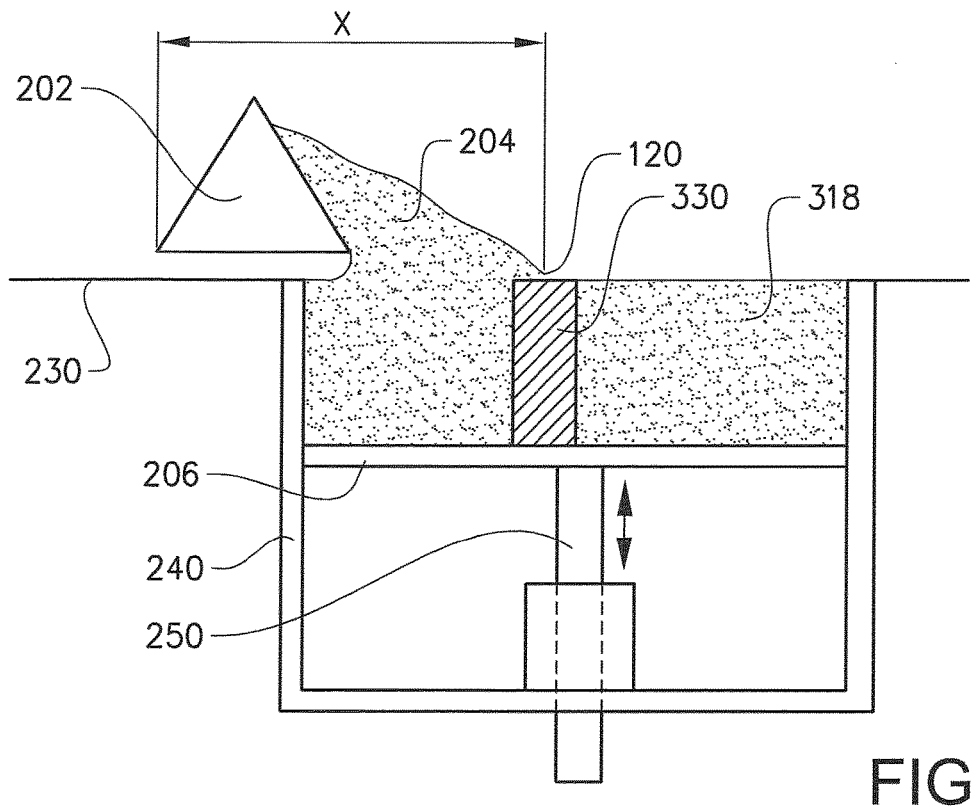
FIG. 6 depicts a side view of an alternative powder distribution process according to prior art.

FIG. 6 depicts from a side view a powder distribution mechanism. The powder distributor 202 is distributing the powder 204 in front of the powder distributor 202 on said build platform 206. During the powder distribution process over said build platform 206 the distance X, which is the distance from the back portion of the powder distributor to the front portion of the powder which is to be distributed, is varied due to the fact that powder is consumed as it is provided on top of the build platform as the powder distributor is moving across the build platform. The value of X may be an indication of insufficient or a surplus of powder in front of the powder distributor at any given position during the powder distribution process.

At least one image may be taken during the distribution of powder for forming a powder layer on the start plate 316. In an example embodiment images are taken at the start of powder distribution and at the end of powder distribution. In another example embodiment images may also be taken at any position between said start and finish of the powder distribution.

At least one value of at least one parameter in at least one image which may be detected with said camera may be compared with a corresponding reference parameter value denoted with 410 in FIG. 4*a*. In an example embodiment a distance of the powder front to a reference position may be a reference parameter. Reference parameters may be stored in a look up table. Said reference position may for instance be any part of the powder distributor such as the front side or backside. The reference position may also be a fixed position within the build chamber, such as a predetermined position of the vacuum chamber.

The shape of powder in front of the powder distributor and/or the distance to back or front of the powder distributor to a powder front 120 may be examples of said parameter in said image. Reference images of shapes of powder in front of the powder distributor may be stored in the control unit for comparison with the actual shape. If the shape is deviating more than a predetermined amount from any one of the stored images a warning message may be sent out and/or stored in the control unit 270. The reference shape may for instance be a suitable mathematical expression, such as a polynomial or a parabola or any other shape that is desired for the powder front to be at any given time during the powder distribution process. This mathematical expression may be compared to the actual image taken of the powder front. In a look up table it may be stored the desired shape of the powder front at a given time. This shape from the look up table may be compared with the actual value and any difference that is deviating more than a Δ-value from the desired shape may be a sign of a failure in the powder distribution process. The shape of the powder front in the image may be approximated with a given mathematical expression such as $A+BX+CX^2+DX^3$, where A, B, C and D are constants. If any one of the constants in the approximated polynomial from said image is deviating more than a Δ-value from a corresponding constant in the reference polynomial, this may be a sign of a failure in the powder distribution process. Said Δ-value may be different for different constants in a given polynomial. The value of Δ may be set depending on the tolerance of a difference between desired and actual shape of the powder front, larger Δ-value indicated a larger tolerance for differences than a smaller Δ-value.

Any other parameter than the shape may be stored in a look up table such as the distances mentioned below. As with the shape said distances have a desired value for any given time and may be compared with the actual value. If there is a difference larger than a Δ-value between said desired value and said actual value such a difference may be an indication of a failure in the powder distribution process.

Figure 7:
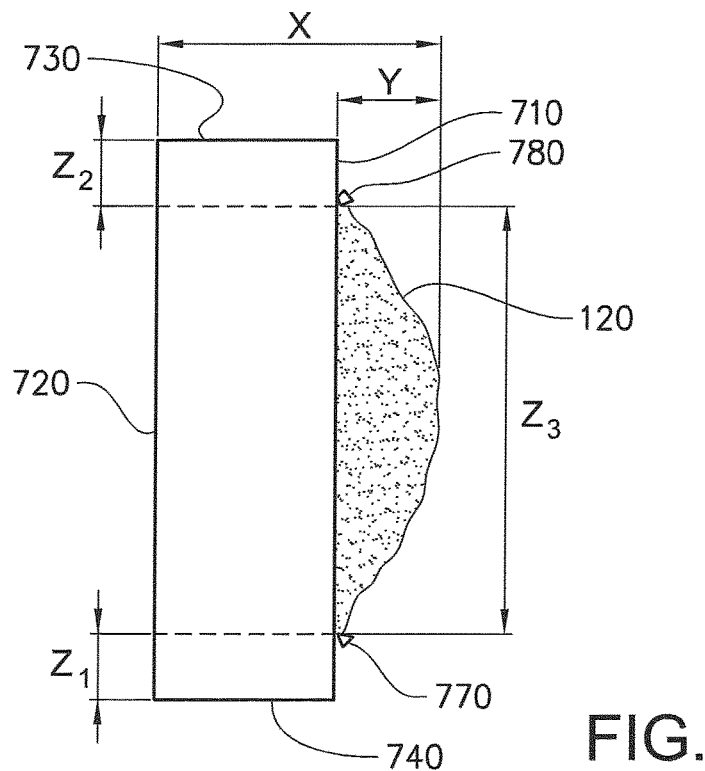
FIG. 7 depicts alternative parameter values taken from a single image.

In FIG. 7 it is depicted examples of different parameter values which may be taken from a single camera image. Not only a comparison of the shape of the powder front as was discussed above may be possible to compare with stored reference images but also the distance of the powder front to a front side 710, denoted by Y, or to a back side 720 denoted by X. If the distance from the actual image at a given position of the powder distributor is deviating more than a Δ-value from a stored value for the powder distributor at the given position of said powder distributor a warning signal may be sent to the control computer 270. A distance from a first end portion 770 of the powder front 120 to a first end of the powder distributor 740 is another parameter value which may be of interest which is denoted by Z1 in FIG. 7. A distance from a second end portion 780 of the powder front 120 to a second end of the powder distributor 730 is still another parameter value which may be of interest which is denoted by Z2 in FIG. 7. Despite the fact that the shape of the powder front may be correct, said powder front may be offset in one or another direction resulting in different values of Z1 and Z2. If the difference between Z1 and Z2 is deviating more than a predetermined value a signal may be sent to the control computer 270. Another parameter which may be of interest is the length of the powder front from the first end portion 770 to the second end portion 780. This parameter value is denoted by Z3 in FIG. 7. The reference parameters may be stored in a look up table which in turn may be located in or in connection to the control computer 270. Reference parameters corresponding to the above mentioned X, Y, Z1, Z2, Z3 may be found in such a look up table for a number of positions of the powder distributor. Such reference parameters may be different for different materials and different thicknesses of the powder layer.

In said control unit 270 there may also be several values stored for said distance of powder front to said powder distributor which may be compared with actual distances of the powder front 120 to the powder distributor. In an example embodiment several measurements of said distance of said powder front to said powder distributor 202 may be taken from a single image, i.e., at several positions along the powder distributor 202. By taking more than one measurement of said distance one may make assure that the powder is not unevenly distributed in front of the powder distributor 202. Unevenly distributed powder may possibly be the cause for unevenly distributed powder, i.e., less or no powder at a specific location. If the measured distance of the powder front to said powder distributor 202 for any distance of the powder distributor 202 and any position along the powder distributor 202 is deviating more than a predetermined value from a reference value of a corresponding reference distance of the powder front to the powder distributor 202 a warning message may be sent out and/or said position of said powder distributor 202 together with said position along said powder distributor 202 may be stored in said control unit 270.

Figure 4B:
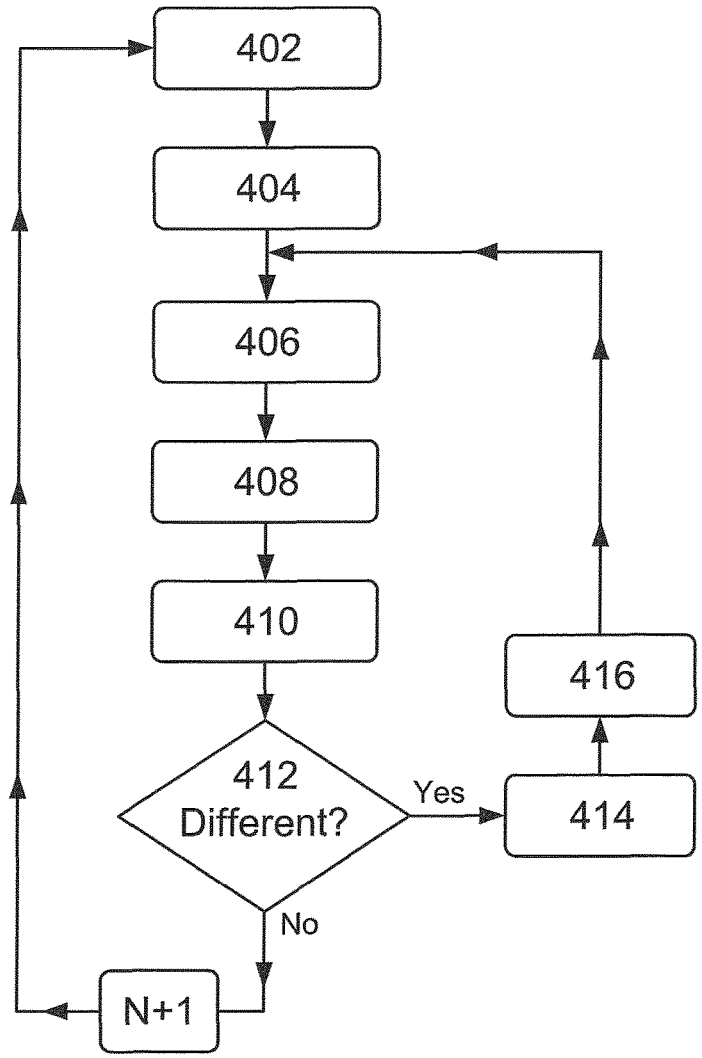
FIG. 4b depicts a flow chart of a second example embodiment of the method according to the present invention.

FIG. 4*b* depicts another example embodiment of the method according to the present invention. The steps 402, 404, 406, 408 and 410 are equal to the steps in FIG. 4*a*. If the comparison in step 410 reveals that there is no difference between the reference parameter value and the actual measured value from the image the next layer is provided on the start plate 316 with the same settings for the powder distributor. The box N+1 indicates that the layer N+1 is to be provided on the start plate 316 and therefore starts all over from step 402, where N is an integer being larger than 1 and equals to the number of the previous layer of powder being distributed on the start plate 316. On the other hand, if there is a difference between the actual measured value and the reference value the method may go to step 414 after 410. In an example embodiment said difference needs to be greater than a predetermined Δ-value in order to move from step 410 to step 414. Said predetermined Δ-value may be set different for different powder thickness and/or different materials and/or different powder provision mechanism.

In step 414 a different amount of powder is provided on the worktable. A different amount of powder could be provided by changing the distance that said powder distributor 202 is travelling into the scree of powder 220 before being stopped. Alternatively a different amount of powder could be provided by changing the distance said movable floor 362 is lifted. A less distance will provide less powder and a longer distance will provide more powder. In step 416 the changed amount of powder is distributed on the start plate 316 for forming layer N+1. In an example embodiment the amount of powder at the end of the powder distribution process may indicate a superfluous amount of powder in front of the powder distributor although the powder distribution has been finished. In such case the amount of powder may be reduced for the following layer.

As disclosed above the powder distributor 202 may be set to travel a less distance into the scree of powder 220 in order to let a less amount of powder to fall over the top of the powder distributor. On the other hand, if the measurement indicates that the powder in front of the powder distributor is decreasing, the settings of the powder distributor may be changed in order to collect more powder from the scree of powder 220. As an alternative to provide less powder in front of the powder distributor, said floor in said powder tank may be set to travel a less distance upwards thereby providing a less amount of powder which is possible to be raked off by the powder distributor and to be distributed on said start plate 206, 314.

Figure 4C:
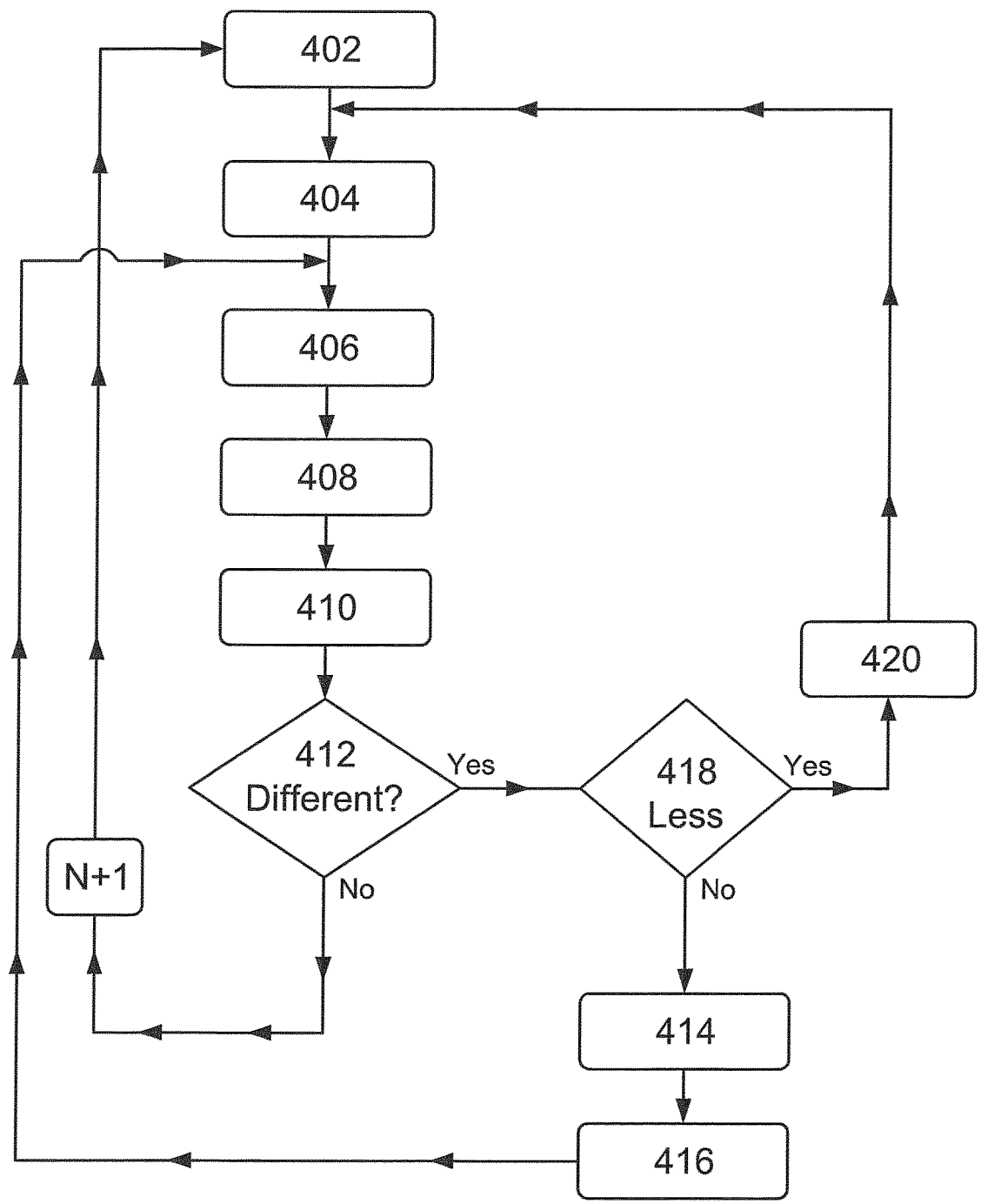
FIG. 4c depicts a flow chart of a third example embodiment of the method according to the present invention.

FIG. 4c depicts yet an alternative example embodiment of the method according to the present invention. If there is no difference between the actual measured parameter value and a predetermined reference parameter value, the next powder layer may be started to be distributed with the same settings as the previous powder layer indicated in FIG. 4c with a line connecting together step 410 and step 402.

If the measured parameter value is in fact more than a predetermined value from the reference parameter value, then the next question may be, denoted in FIG. 4c with 418, "less than the reference parameter value"? If the answer to said question is "NO", then step 414 and 416 applies which is disclosed in relation to FIG. 4b. However, if the answer is "YES", then step 420 applies. In step 420 a second predetermined amount of powder may be provided for forming said first powder layer for a second time and distributing said second predetermined amount of powder for forming said first powder layer for said second time. If at any position the actual measured parameter value is less than the reference parameter value there may a risk that no powder is distributed at one or more locations of the start plate 316. In order to make sure that powder is evenly distributed all over the work table 316 another powder distribution is taking place for forming the same powder layer a second time. This is indicated in FIG. 4c by connecting 420 between step 402 and step 404. In step 402 it is provided a predetermined amount of powder on the powder table to be distributed over the start plate 316 for forming layer N.

In step 420 a second predetermined amount of powder may be provided on said powder table for forming layer N. Said second predetermined amount of powder may be different to said predetermined amount of powder in step 402. Since a second powder distribution is taking place after providing the second predetermined amount of powder for forming layer N a relatively small amount of powder is needed to fill in the possible holes/gaps in the layer already provided at the first instance. A smaller amount of powder may be collected from the scree of powder by letting the powder distributor travelling a less distance into the scree of powder than normally, i.e., in the case when said predetermined amount of powder is provided on said powder table said powder distributor is travelling a first distance into the scree of powder and when said second amount of powder may be provided on said powder table said powder distributor may be travelling a second distance into the scree of powder. Here the second distance may be less than said first distance in order to collect less powder in the second collection for distribution over the start plate 316 a second time for forming layer N. Alternatively a different amount of powder could be provided by changing the distance said movable floor 362 may be lifted upwards.

A feedback signal may be generated if there is a mismatch between the measured parameter value and a corresponding reference parameter value. The feedback signal may go from the control unit 270 to a powder provision apparatus for changing the amount of powder provided on said powder table. In an example embodiment no powder table may be present. The amount of powder provided may in such case be achieved by changing the distance said movable floor 362 is lifted upwards.

In another aspect of the invention it is provided an apparatus for forming a three-dimensional article through successive fusion of parts of a powder bed, which parts corresponds to successive cross sections of the three-dimensional article. Said apparatus may comprise means for providing a predetermined amount of powder at a powder table for forming a first powder layer on a start plate. Said means for providing a predetermined amount of powder at said powder table may be a powder hopper as indicated in FIGS. 2 and 3 with an opening at the bottom for creating a scree of powder on said powder table. Another means for providing powder on said powder table may be a rotating barrel which for each revolution ejects at least once a predetermined amount of powder. Another means for providing powder may be a powder hopper with an opening at the bottom. A mechanical shutter may open and close the opening for providing a predetermined amount of powder below said opening. As the skilled person realises there exist numerous ways of providing powder on said powder table and the examples above is just a few of them. Said apparatus further comprises a powder distributor for distributing said predetermined amount of powder for forming said first powder layer and means for directing an energy beam over said start plate causing said first powder layer to fuse in selected locations according to a model to form a first cross section of said three-dimensional article. Said means for directing the energy beam may be a magnetic coil if the energy beam is in the form of an electron beam. If the beam is in the form of a laser beam said means for directing the beam may be a reflecting mirror which is tiltable.

Said apparatus further comprising a camera for capturing at least one image of the powder to be distributed at least one time during said distribution of said powder on said start plate for forming said first powder layer and means for comparing at least one value of at least one parameter in said image detected by said camera with a reference parameter value.

The means for comparing parameter values from the image with reference values may be a software program which makes analysis and measurements at predetermined image locations and comparing these measurements with stored reference values. Said apparatus may further be provided with a feature which provides for an alarm if the measured value and the reference value differs more than a predetermined value from each other. Another feature that said apparatus may be provided with is a storing function which stores the location of the powder distributor if the measured value and the reference value differs more than a predetermined value from each other.

In another example embodiment of said apparatus there is provided means for changing said predetermined amount of powder for forming a second powder layer on said start plate if at least one parameter value in said image is deviating from said reference parameter value. Said means may be programmable instructions sent from the control unit 270 to the powder distributor indicating that the distance of travel into the scree of powder is changed. In an alternative design of said provision of powder, e.g., in case of a shutter in front of the bottom opening of a powder hopper, the time and/or the area of opening of said shutter may be changed in order to change the predetermined amount of powder.

In still another example embodiment said apparatus comprises means for providing a second predetermined amount of powder for forming said first powder layer and distributing said second predetermined amount of powder for forming said first powder layer if at least one parameter value is less than a reference parameter value. The means may be the same as disclosed above for providing the second predetermined amount of powder, i.e., it may be a question of settings of the powder distributor or shutter which determines the amount of powder provided on said powder table. A second powder distribution for forming one and the same powder layer may take place if there may be an indication that there may be one or more places of nonsufficient powder.

The energy beam, which may be a laser beam or an electron beam, not only melts the last applied powder layer but also at least the layer of material below the powder layer resulting in a melt comprising the powder material and already melted material from a previous fusion process.

The invention is not limited to the above-described embodiments and many modifications are possible within the scope of the following claims. Such modifications may, for example, involve using a different source of ray gun than the exemplified electron beam such as laser beam. Other materials than metallic powder may be used such as powders of polymers and powder of ceramics.

The invention claimed is:

1. A method for forming a three-dimensional article through successive fusion of parts of a powder bed, which parts corresponds to successive cross sections of the three-dimensional article, said method comprising the steps of:
   providing a predetermined amount of powder on a powder table for forming a first powder layer on a surface;
   distributing said predetermined amount of powder initially from said powder table to and over said surface for forming said first powder layer on said surface;
   directing an energy beam over said first powder layer causing said first powder layer to fuse in selected locations according to a model to form a first cross section of said three-dimensional article;
   capturing at least one image of a shape of at least one portion of said predetermined amount of powder that has yet to be initially distributed, said at least one image being captured with a camera at least one time during said initial distribution of another portion of said predetermined amount of powder from said powder table to said surface, said at least one image being captured with the camera prior to distribution of an entirety of all portions of said predetermined amount of powder over said surface and prior to removal of any portions of said predetermined amount of powder from said surface; and
   comparing at least one value of at least one parameter in said image detected by said camera with a corresponding reference parameter value,
   wherein the at least one parameter is associated with the shape of the at least one portion of said predetermined amount of powder that has yet to be initially distributed.

2. The method according to claim 1, further comprising the step of changing said predetermined amount of powder for forming a second powder layer on top of said first powder layer which is fused in selected locations if at least one parameter value in said image of said powder when forming said first powder layer is deviating at least one Δ-value from a corresponding reference parameter value.

3. The method according to claim 2, wherein said step of changing said predetermined amount of powder involves at least one of an increase or a decrease in said predetermined amount.

4. The method according to claim 1, further comprising the step of providing a second predetermined amount of powder for forming said first powder layer a second time and distributing said second predetermined amount of powder for forming said first powder layer said second time if at least one parameter value in said image is at least one Δ-value smaller than a corresponding reference parameter value when forming said first powder layer said first time.

5. The method according to claim 4, wherein said predetermined amount of powder is different than said second predetermined amount of powder.

6. The method according to claim 1, wherein said energy beam is an electron beam.

7. The method according to claim 1, wherein said powder is metallic powder.

8. The method according to claim 1, wherein said image is captured by at least one of an IR-camera, a CCD-camera, a digital camera, a CMOS camera, or a NIR-camera.

9. The method according to claim 1, wherein said parameter in said image may be selected from the group of: a shape of powder front in front of a powder distributor; a distance of powder front to a reference position; a width of powder front; and a position of powder front.

10. The method according to claim 1, wherein said surface on top of which said first powder layer is provided is at least one of a powder bed or a start plate.

11. The method according to claim 1, wherein said powder table is a powder container with a movable floor for providing said predetermined amount of powder.

* * * * *